United States Patent
Hunt et al.

(10) Patent No.: US 8,305,218 B2
(45) Date of Patent: *Nov. 6, 2012

(54) SYSTEM AND PROGRAM PRODUCT FOR AUTOMATIC RFID ATTENUATION AND RECOVERY

(75) Inventors: Christian L. Hunt, Cary, NC (US); Vincent M. Padua, Chapel Hill, NC (US); Robin A. Radez, Westport, CT (US); William A. Reichert, III, Buda, TX (US); Gregory C. Smith, Raleigh, NC (US); Oriana J. Williams, Dallas, TX (US)

(73) Assignee: International Business Machines Corporation, Armonk, NY (US)

( * ) Notice: Subject to any disclaimer, the term of this patent is extended or adjusted under 35 U.S.C. 154(b) by 1066 days.

This patent is subject to a terminal disclaimer.

(21) Appl. No.: 12/190,753

(22) Filed: Aug. 13, 2008

(65) Prior Publication Data

US 2009/0051495 A1    Feb. 26, 2009

Related U.S. Application Data

(63) Continuation of application No. 11/358,276, filed on Feb. 21, 2006, now Pat. No. 7,439,864.

(51) Int. Cl.
*G08B 13/14*    (2006.01)
(52) U.S. Cl. .................. 340/572.7; 340/572.1; 340/10.1
(58) Field of Classification Search .... 340/572.1–572.8, 340/10.1, 10.3; 343/745
See application file for complete search history.

(56) References Cited

U.S. PATENT DOCUMENTS

| | | | |
|---|---|---|---|
| 6,785,513 B1 | 8/2004 | Sivaprakasam | |
| 6,812,839 B1 | 11/2004 | Belcher et al. | |
| 6,903,656 B1 | 6/2005 | Lee | |
| 7,187,287 B2 | 3/2007 | Ryal | |
| 7,439,864 B2* | 10/2008 | Hunt et al. | 340/572.7 |
| 2004/0145454 A1 | 7/2004 | Powell et al. | |
| 2004/0164858 A1 | 8/2004 | Lin | |
| 2004/0264441 A1* | 12/2004 | Jalkanen et al. | 370/352 |
| 2005/0040974 A1 | 2/2005 | Shanks et al. | |
| 2005/0088299 A1 | 4/2005 | Bandy et al. | |
| 2005/0093679 A1 | 5/2005 | Zai et al. | |
| 2005/0113138 A1 | 5/2005 | Mendolia et al. | |

OTHER PUBLICATIONS

Author Unknown, "Antenna Application Alerts Users of Change in Antenna Orientation", http://www.antennasonline.com/ast_newsletter_04-05.htm., Antenna Systems & Technology e-Report, Apr. 2005, pp. 1-9.

Roberts, T., "Using Field-Programmable Analog to Build Adaptable RFID Readers", Embedded Technology, www.rfdesign.com, Oct. 2004, pp. 44-48.

Moskowitz et al., "Calibration Kit", TBD V. 39 No. 1, Jan. 1996, pp. 417-418.

Author Unknown, "AirGATE Technology and Products", AirGATE Technologies, Inc., www.airgatetech.com, pp. 1-10. No Date Available.

* cited by examiner

*Primary Examiner* — Anh V La
(74) *Attorney, Agent, or Firm* — Jordan IP Law, LLC

(57) ABSTRACT

The invention provides a system and program product for attenuating a radio frequency identification (RFID) reader. In one embodiment, the system includes optimizing a coverage area of an RFID reader.

14 Claims, 10 Drawing Sheets

SYSTEM AND PROGRAM PRODUCT FOR AUTOMATIC RFID ATTENUATION AND RECOVERY

The current application is a continuation application of U.S. patent application Ser. No. 11/358,276, filed on Feb. 21, 2006, now U.S. Pat. No. 7,439,864 which is hereby incorporated by reference.

BACKGROUND OF THE INVENTION

1. Technical Field

The invention relates generally to radio frequency identification, and more particularly, to a method, system, and program product for automatically attenuating RFID antennas and recovering from failure or an RFID antenna or reader.

2. Background Art

Radio frequency identification (RFID) is a widely-used method for identifying and/or tracking items. RFID may be used, for example, to maintain an inventory of goods or to grant access to secured areas by an individual carrying an RFID device.

Generally, employing RFID in the performance of such tasks requires the establishment of an RFID network, including RFID readers, in order to read RFID "tags" within the network. RFID readers emit radio waves capable of detection by RFID tags. An RFID tag is essentially a bundled microchip and antenna capable of detecting the radio waves emitted by an RFID reader and returning to the reader information stored on the microchip. Typically, an RFID tag includes a unique serial number, allowing for unique identification of the tag and, consequently, an item bearing the tag.

Establishing an RFID network can be time consuming and expensive. Generally, RFID readers must be extensively calibrated in order to function well within a chosen area. Such calibration may be complicated, for example, by the presence of interfering devices, building materials, etc. Typically, the calibration of RFID readers requires a radio frequency (RF) specialist to investigate the environment in which the network will be employed and decide on an appropriate network configuration. Such configuration includes, for example, the ranges and operating channels of individual readers and their antennas. The actual establishment of the RFID network may include further calibration to accommodate site-specific variables.

Common problems with RFID networks include reader collision and tag collision. Reader collision is caused by the overlap of the radio waves of different RFID readers. RFID tags are unable to simultaneously respond to signals from multiple RFID readers and consequently may not respond to signals from any RFID reader. Tag collision involves the presence of a large number of RFID tags in a relatively small area, such that too many tags attempt to simultaneously respond to an individual RFID reader. Avoiding these and other problems involves the proper placement and calibration of RFID readers throughout the area to be covered by the RFID network.

For example, referring to FIG. 1, an RFID network 100 is shown, comprising a plurality of RFID readers 120, 122, 124, 126 within an network area 110. As shown, the RFID readers include omnidirectional antennas, such that their coverage areas 130, 132, 134, 136 are substantially circular. Antennas producing other signal patterns are also commonly employed. Ideally, RFID readers are deployed such that an RFID tag 140, 142 anywhere within network area 110 will receive a signal from only one RFID reader. In FIG. 1, however, this is not the case. RFID tag 140 is not within the coverage area of any RFID reader and, as a consequence, is "invisible" to network 100. In addition, RFID tag 142 is within the range of two RFID readers 120, 126, as it is located within an overlap zone 150. As such, RFID tag 142 may be subject to reader collision and unable to respond to either RFID reader. Other overlap zones 152, 154 are shown between coverage areas 130 and 134 and coverage areas 132 and 134, respectively.

An additional problem of network 100 is that a large portion 160 of network area 110 is not serviced by the coverage area of any RFID reader. This may be particularly problematic in cases where an RFID tag is affixed to a movable object. Such an RFID tag will appear to move into and out of network 100 as the tag moves from into and out of the coverage areas of RFID readers.

One solution to the problems shown in FIG. 1 is to change the location of one or more RFID reader within network area 110. For example, FIG. 2 shows network 100 following the relocation of RFID readers 120, 122, and 126. As can be seen, RFID tag 140 is now within coverage area 130 of RFID reader 120 and RFID tag 142 is within coverage area 136 of RFID reader 126 only. Such a solution is not ideal, however. A large portion 160 of network area 110 is still not covered by the coverage area of any RFID reader. In addition, the movement of either or both RFID tags 140, 142 may require again relocating one or more RFID reader.

Maintenance of an RFID network is similarly labor-intensive. The failure of an RFID reader or antenna within an RFID network is likely to leave at least a portion of the network's coverage area unserviced. For example, referring now to FIG. 3, the network 100 of FIG. 2 is shown, wherein RFID reader 126 has, for any number of reasons, become inactive. As a result, RFID tag 142 is no longer within the coverage area of any RFID reader. As in FIG. 2, one or more RFID readers could be relocated such that their coverage areas include the portion of network area 110 previously covered by RFID reader 126. As explained above, such an approach is both time-consuming and expensive. In deployments where the loss of signal from an RFID reader is a frequent occurrence, such an approach becomes impracticable.

In addition, once an RFID network is established and calibrated, its components generally must be replaced with the same or similar components, which often must be recalibrated in order to function within the network. The addition of an RFID reader to an existing network can be more complicated, as doing so often requires the recalibration of readers adjacent the new reader in order to reduce interference caused by the new reader.

To this extent, a need exists for a robust RFID network that does not require relocation of RFID readers following the failure of an RFID reader or antenna or the addition of an RFID reader to the RFID network.

SUMMARY OF THE INVENTION

The invention provides a method, system, and program product for attenuating a radio frequency identification (RFID) reader. In one embodiment, the method includes optimizing a coverage area of an RFID reader.

A first aspect of the invention provides a method for attenuating a radio frequency identification (RFID) reader, the method comprising: automatically calibrating at least one antenna of a first RFID reader to a first calibration RFID tag, wherein automatically calibrating includes at least one of the following: optimizing a coverage area of the first RFID reader; and mitigating environmental interference within a coverage area of the first RFID reader.

A second aspect of the invention provides a method for determining a source of failure in a radio frequency identification (RFID) network, comprising: automatically recalibrating an RFID reader adjacent a non-reporting RFID reader to respond to an unread calibration RFID tag within a coverage area of the non-reporting RFID reader; in the case that data from the unread calibration RFID tag are not received by the RFID reader adjacent the non-reporting RFID reader, concluding that the non-reporting RFID reader is the source of failure in the RFID network; in the case that data from the unread calibration RFID tag are received by the RFID reader adjacent the non-reporting RFID reader, automatically recalibrating a range of an RFID antenna adjacent a non-receiving RFID antenna to respond to an unread calibration RFID tag; in the case that data from the unread calibration RFID tag are not received by the RFID antenna adjacent the non-receiving RFID antenna, concluding that the non-receiving RFID antenna is the source of failure in the RFID network; and in the case that data from the unread calibration RFID tag are received by the RFID antenna adjacent the non-receiving RFID antenna, concluding that the unread calibration RFID tag is the source of failure in the RFID network.

A third aspect of the invention provides a system for attenuating a radio frequency identification (RFID) reader, the system comprising: a system for automatically calibrating at least one antenna of a first RFID reader to a first calibration RFID tag, wherein the system for automatically calibrating includes at least one of the following: a system for optimizing a coverage area of the first RFID reader; and a system for mitigating environmental interference within a coverage area of the first RFID reader.

A fourth aspect of the invention provides a program product stored on a computer-readable medium, which when executed, attenuates a radio frequency identification (RFID) reader, the program product comprising: program code for automatically calibrating at least one antenna of a first RFID reader to a first calibration RFID tag, including at least one of the following: program code for optimizing a coverage area of the first RFID reader; and program code for mitigating environmental interference within a coverage area of the first RFID reader.

A fifth aspect of the invention provides a method for deploying an application for attenuating a radio frequency identification (RFID) reader, comprising: providing a computer infrastructure being operable to: automatically calibrate at least one antenna of a first RFID reader to a first calibration RFID tag, including at least one of the following: optimize a coverage area of the first RFID reader; and mitigate environmental interference within a coverage area of the first RFID reader.

The illustrative aspects of the present invention are designed to solve the problems herein described and other problems not discussed.

BRIEF DESCRIPTION OF THE DRAWINGS

These and other features of this invention will be more readily understood from the following detailed description of the various aspects of the invention taken in conjunction with the accompanying drawings that depict various embodiments of the invention, in which.

It is noted that the drawings of the invention are not to scale. The drawings are intended to depict only typical aspects of the invention, and therefore should not be considered as limiting the scope of the invention. In the drawings, like numbering represents like elements between the drawings.

DETAILED DESCRIPTION

As indicated above, the invention provides a method, system, and program product for attenuating a radio frequency identification (RFID) reader.

Figure 1:
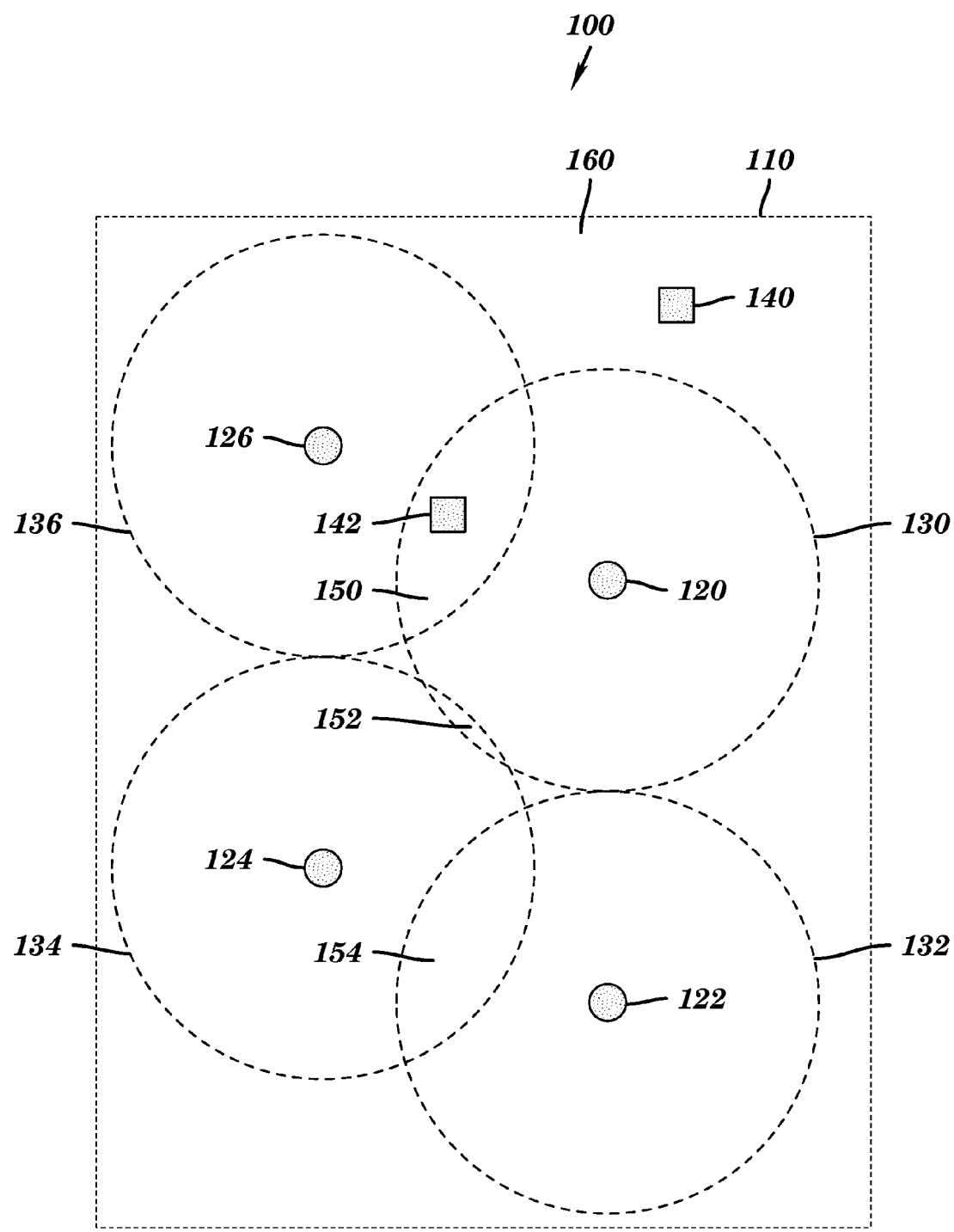
FIGS. 1-3 show known radio frequency identification (RFID) networks.
Figure 2:
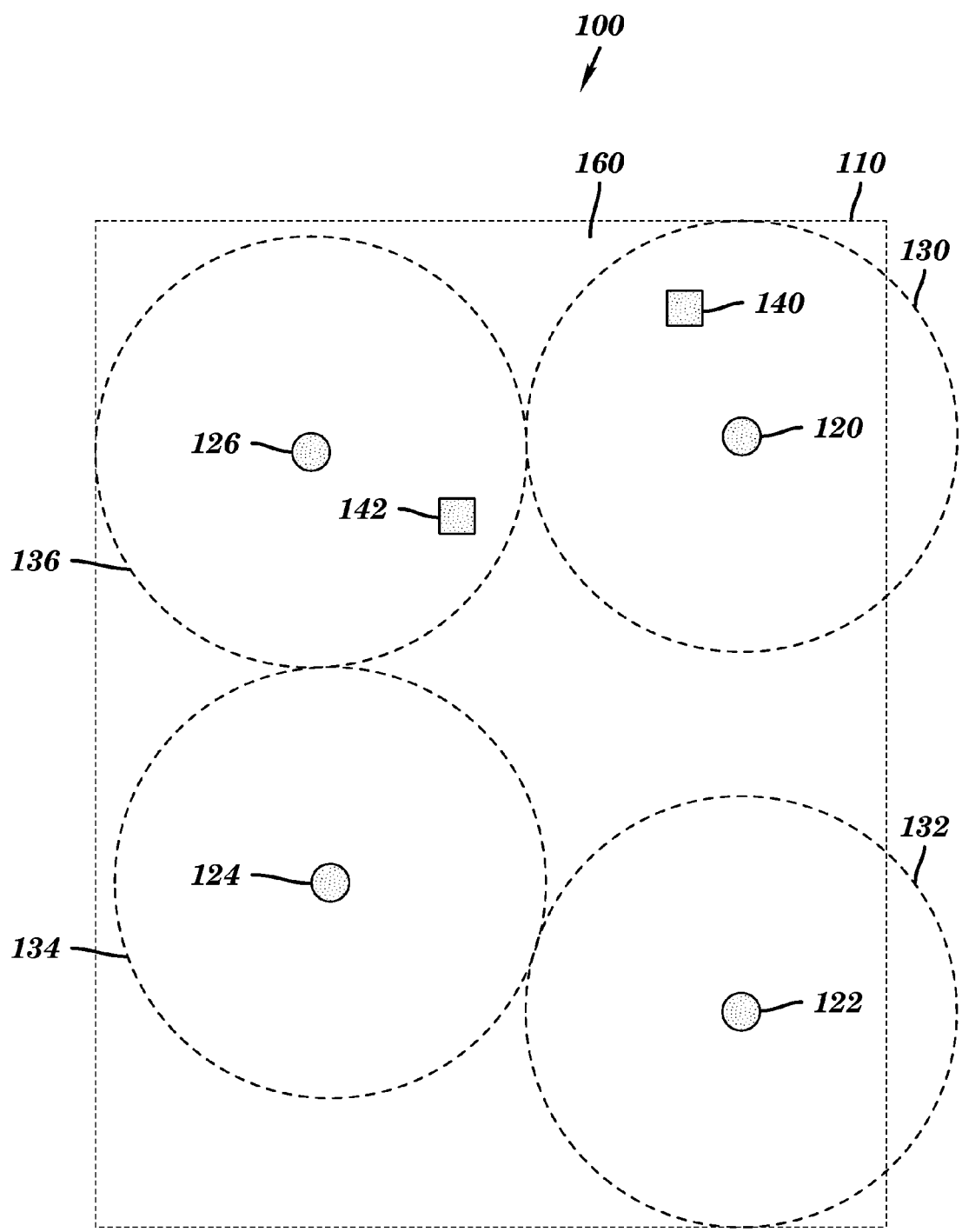
Figure 3:
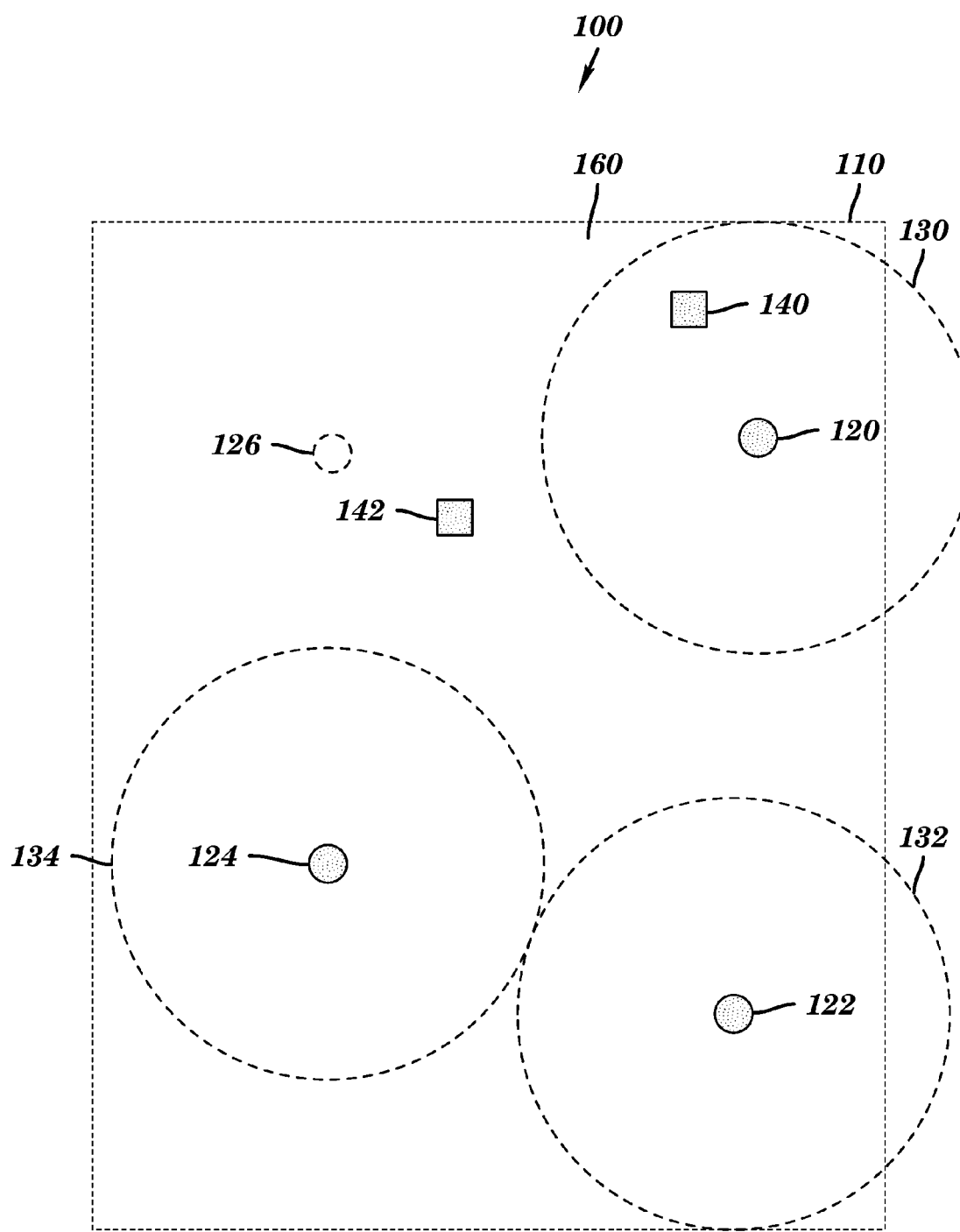
Figure 4:
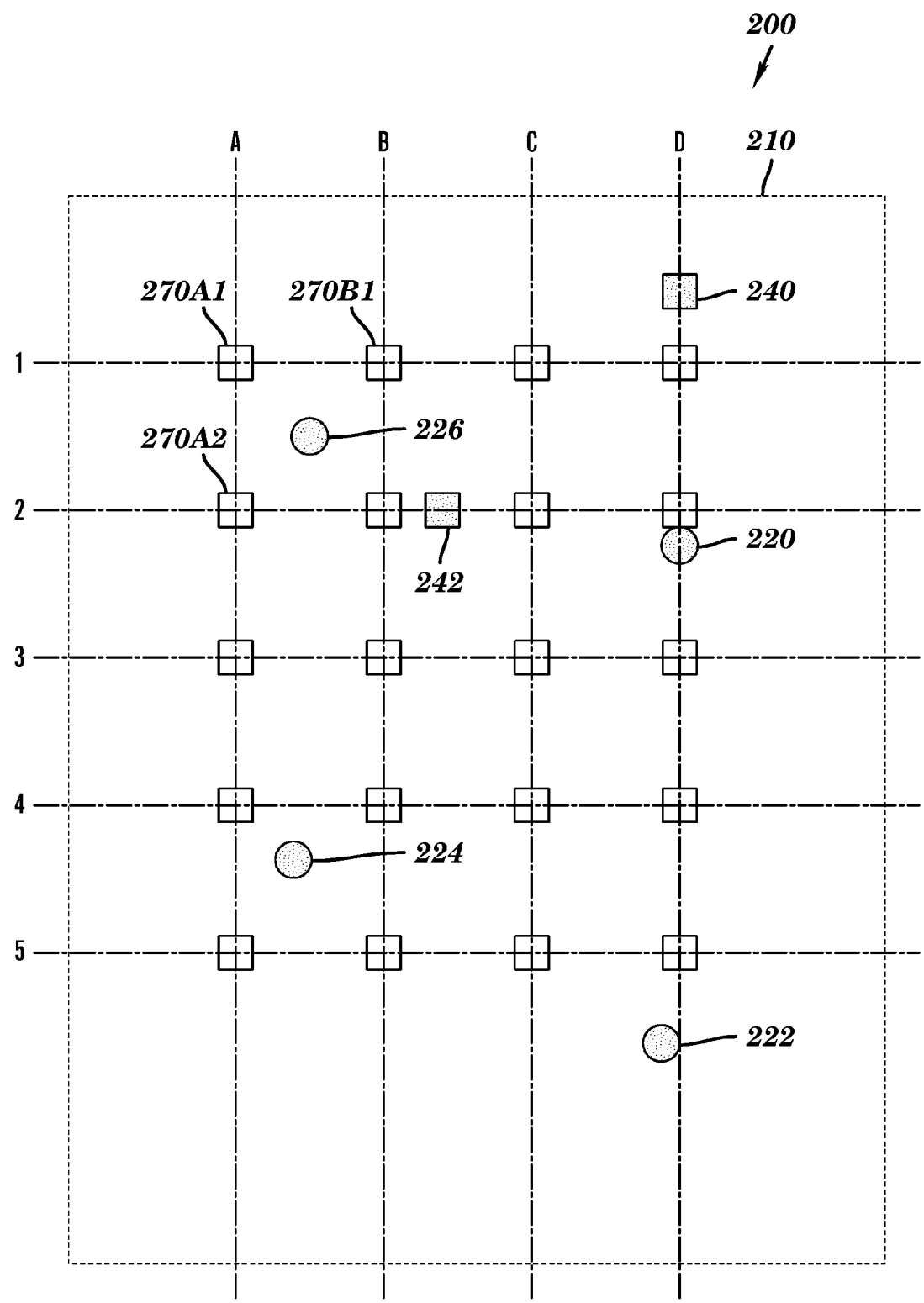
FIGS. 4-7 show illustrative embodiments of RFID networks according to the invention.
Figure 5:
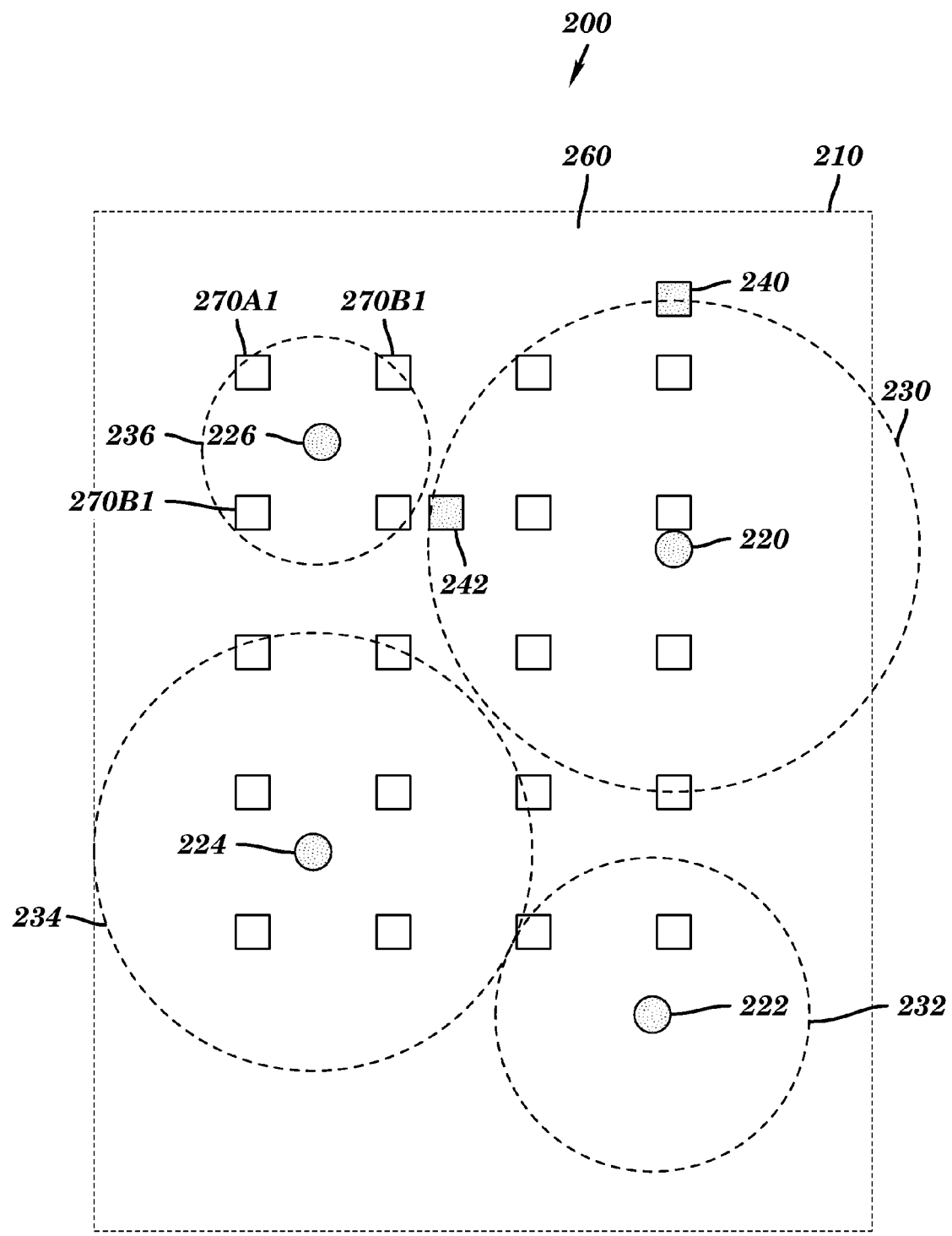
Figure 6:
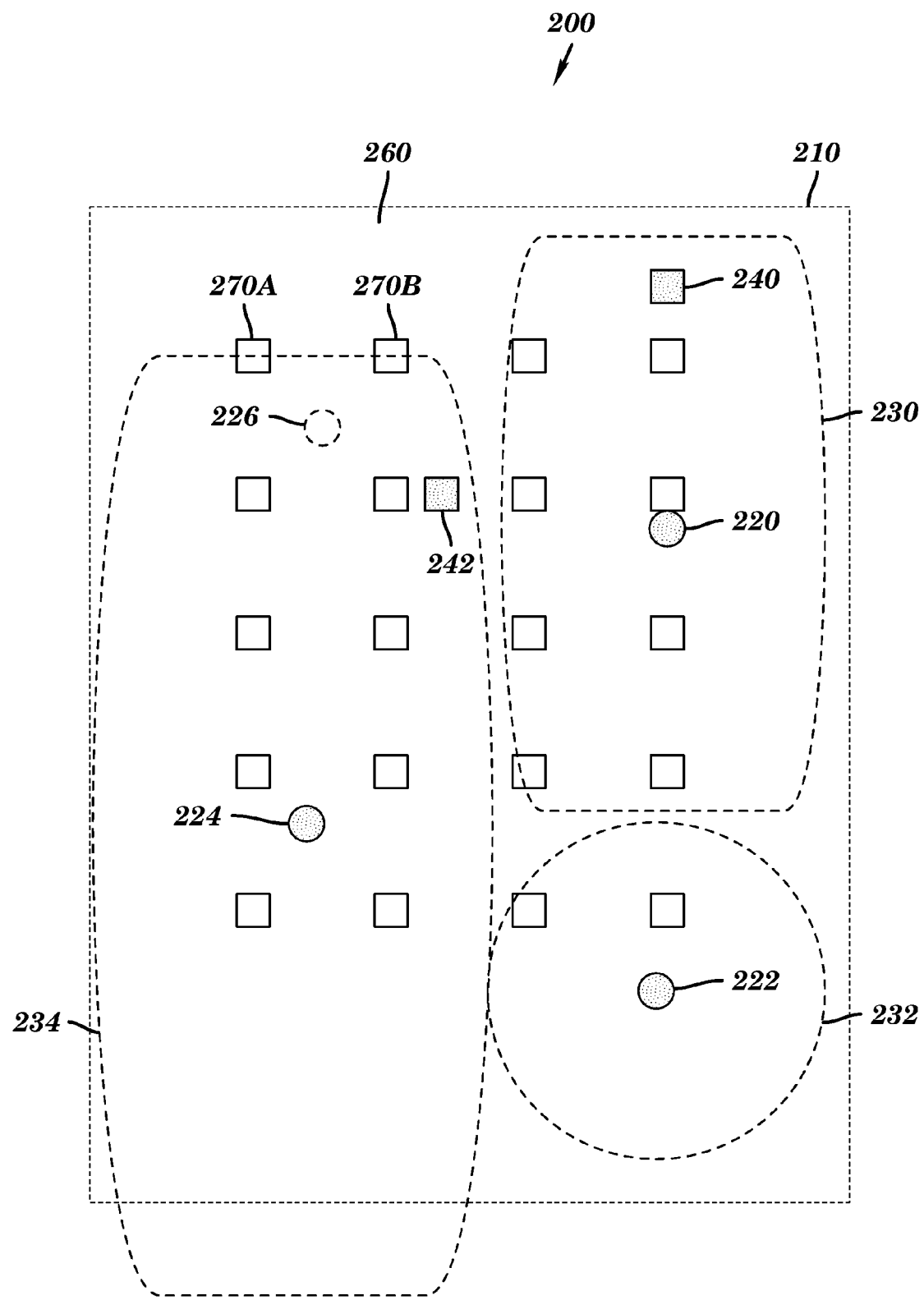

Referring now to FIGS. 4-6, RFID networks 200 according to the invention are shown. In FIG. 4, a plurality of calibration RFID tags 270A1, 270A2, 270B1, etc. have been deployed throughout network area 210. The locations of RFID readers 220, 222, 224, 226 and RFID tags 240, 242 are substantially the same as those in the prior art network 100 of FIG. 1. Unlike RFID tags 240, 242, which are used to track the presence and/or location of an object, calibration RFID tags 270A1, 270A2, 270B1, etc. are used to calibrate RFID readers 220, 222, 224, 226 within network area 210.

The plurality of calibration RFID tags 270A1, 270A2, 270B1, etc. may be deployed throughout network area 210 in any number of configurations. As shown in FIG. 4, each calibration RFID tag is deployed in a two-dimensional matrix of columns A, B, C, D and rows 1, 2, 3, 4, 5. As such, calibration RFID tag 270A1 is deployed in column A, row 1; calibration RFID tag 270B1 is deployed in column B, row 1; calibration RFID tag 270A2 is deployed in column A, row 2; etc.

Such an arrangement of calibration RFID tags permits the automatic attenuation of RFID readers 220, 222, 224, 226 within network area 210. That is, a coverage area of an RFID reader may be calibrated to include one or more calibration RFID tags. Similarly, a plurality of RFID readers may be calibrated such that each calibration RFID tag is within the coverage area of only one RFID reader. As such, the present invention permits optimization of the coverage area of RFID readers, mitigates environmental interference within a coverage area of an RFID reader, and minimizes or eliminates reader collision within the RFID network.

For example, referring now to FIG. 5, the RFID network 200 of FIG. 4 is shown, wherein the coverage areas 230, 232, 234, 236 have been altered following the calibration of each RFID reader 220, 222, 224, 226 to one or more calibration RFID tags 270A1, 270A2, 270B1, etc. As can be seen in FIG. 5, as compared to FIG. 1, coverage areas 236 and 232 are reduced in size while coverage areas 230 and 234 are increased in size. In addition, overlap zones 150, 152, 154 (FIG. 1) have been eliminated and each RFID tag 240, 242 falls within the range of only one RFID reader (i.e. RFID reader 220). As in FIG. 1, a portion 260 of network area 210 remains uncovered by the coverage area of any RFID reader. However, such portions may be reduced or eliminated by, for example, changing the shape of one or more coverage areas. In addition to the circular shapes shown, other commonly employed coverage areas include elongate shapes (e.g., rectangles) and triangular shapes (e.g., pie- and teardrop-like shapes).

In the event that one or more RFID readers within network 200 should fail, active RFID readers may be automatically recalibrated using one or more calibration RFID tags, such that RFID coverage within network area 210 is substantially maintained. For example, in FIG. 6, RFID reader 226 (shown in phantom) has failed. According to an embodiment of the invention, coverage areas 230 and 234 have been automatically recalibrated to one or more calibration RFID tags, substantially maintaining RFID coverage within network area 210. As shown in FIG. 6, the shapes of both coverage area 230 and coverage area 234 have been changed to an elongate, rectangular-like shape. A simple resizing of such coverage areas or a change to another shape or shapes may be similarly employed in substantially maintaining RFID coverage of network area 210.

Figure 7:
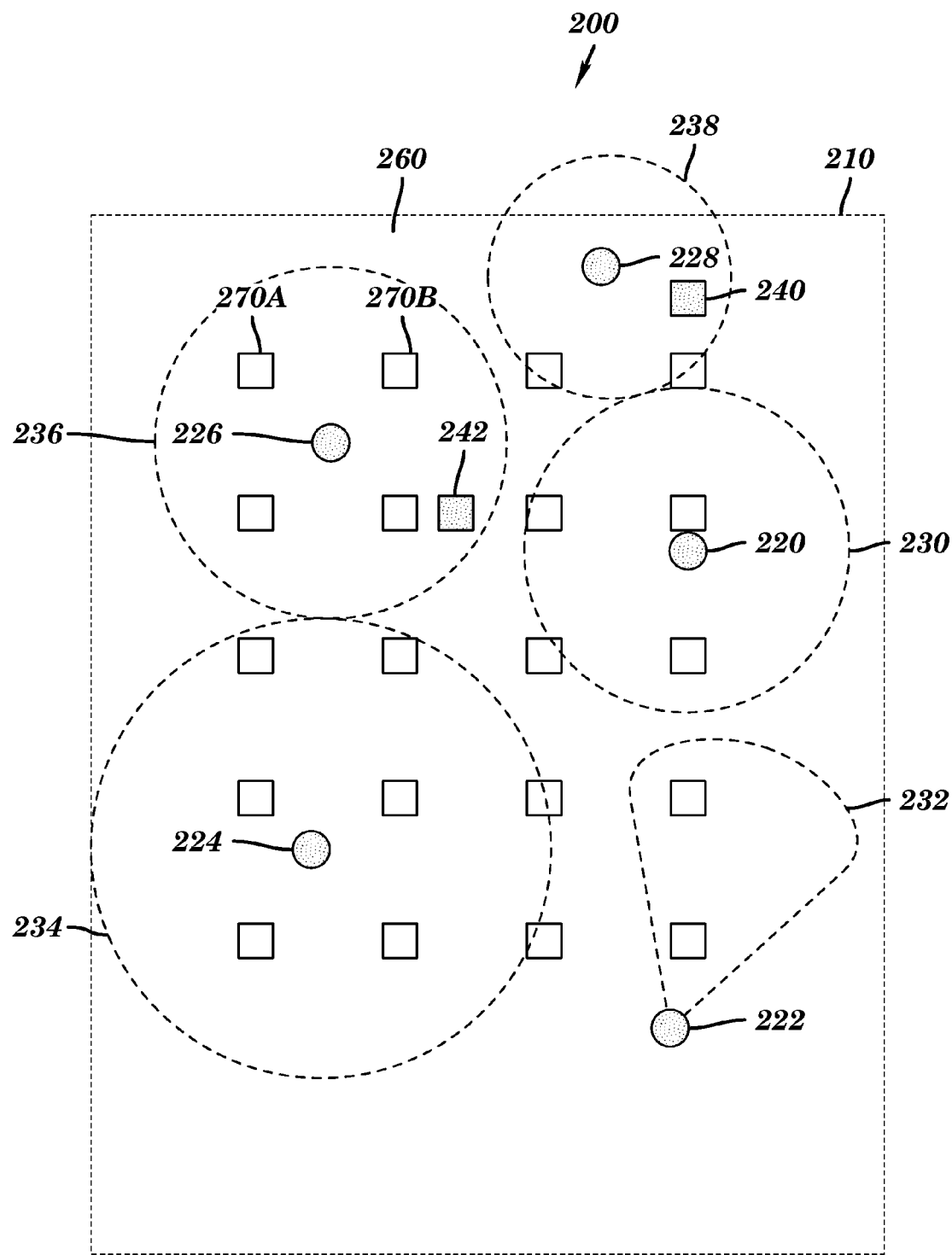

Yet another advantage of the present invention over known methods and systems is the automatic attenuation of one or more RFID readers within an RFID network upon the introduction of an additional RFID reader. For example, referring to FIG. 7, network 200 of FIG. 5 is shown following the addition of an additional RFID reader 228. In such a case, each existing RFID reader 220, 222, 224, 226 and additional RFID reader 228 may automatically be recalibrated to one or more calibration RFID tags 270A1, 270A2, 270B1, etc. As compared to FIG. 5, coverage area 230 has been reduced in size while coverage areas 234 and 236 have been increased in size. In addition, the shape of coverage area 232 has been changed to a teardrop-like shape to avoid an overlap zone between either coverage area 230 or coverage area 234. Such adjustments of coverage areas may similarly be made, for example, in the event that a previously inactive RFID reader is reactivated. The present invention allows each of these changes to be made automatically, with no manual repositioning or adjustment of RFID readers.

Figure 8:
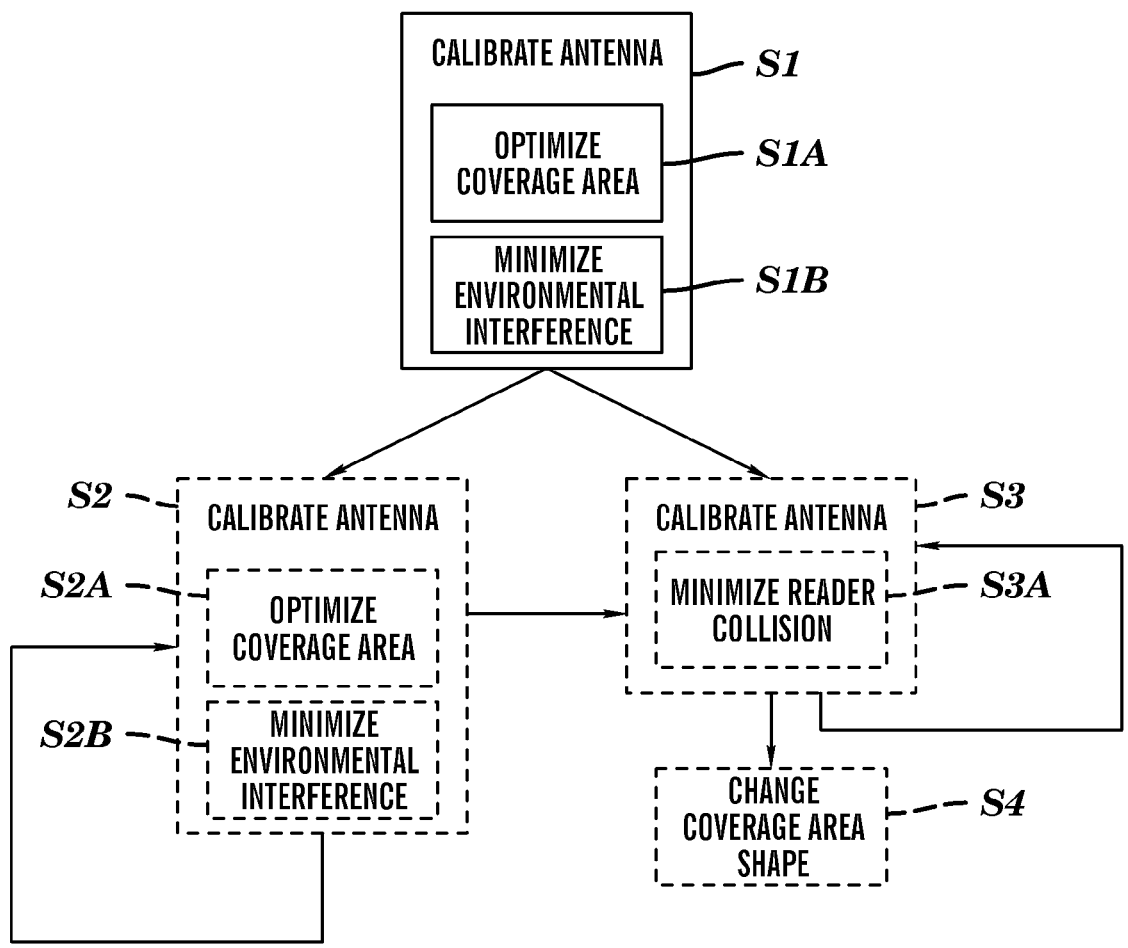
FIGS. 8-9 show block diagrams of illustrative methods according to the invention.

Referring now to FIG. 8, a block diagram of an illustrative method according to the present invention is shown. At step S1, an antenna of an RFID reader is calibrated to a calibration RFID tag. In a preferred embodiment, this includes at least one of: optimizing a coverage area of the RFID reader (step S1A) and minimizing environmental interference (step S1B).

At optional step S2, the same or a different antenna of the RFID reader in step S1 is similarly calibrated to a different calibration RFID tag. As in step S1, in a preferred embodiment, this includes at least one of: optimizing a coverage area of the RFID reader (step S2A) and minimizing environmental interference (step S2B). As shown, step S2 may be iterated for any number of antennas and/or any number of calibration RFID tags.

Next, at optional step S3, an antenna of an RFID reader other than the RFID reader of steps S1 and S2 is calibrated to a calibration RFID tag. In a preferred embodiment, step S2 includes minimizing reader collision between the RFID reader of step S3 and the RFID reader of steps S1 and S2. As shown, step S3 may be iterated for any number of antennas, any number of calibration RFID tags, and/or any number of additional RFID readers.

Finally, at optional step S4, the shape of the coverage area of any RFID reader in any of steps S1 through S3 may be changed, as described above.

The present invention further permits the determination of a source of failure within an RFID network. In the event that a calibration RFID tag is no longer being read by an RFID reader, there are at least three possible explanations involving the failure of a network component: (1) RFID antenna failure, (2) RFID reader failure, and (3) calibration RFID tag failure.

Figure 9:
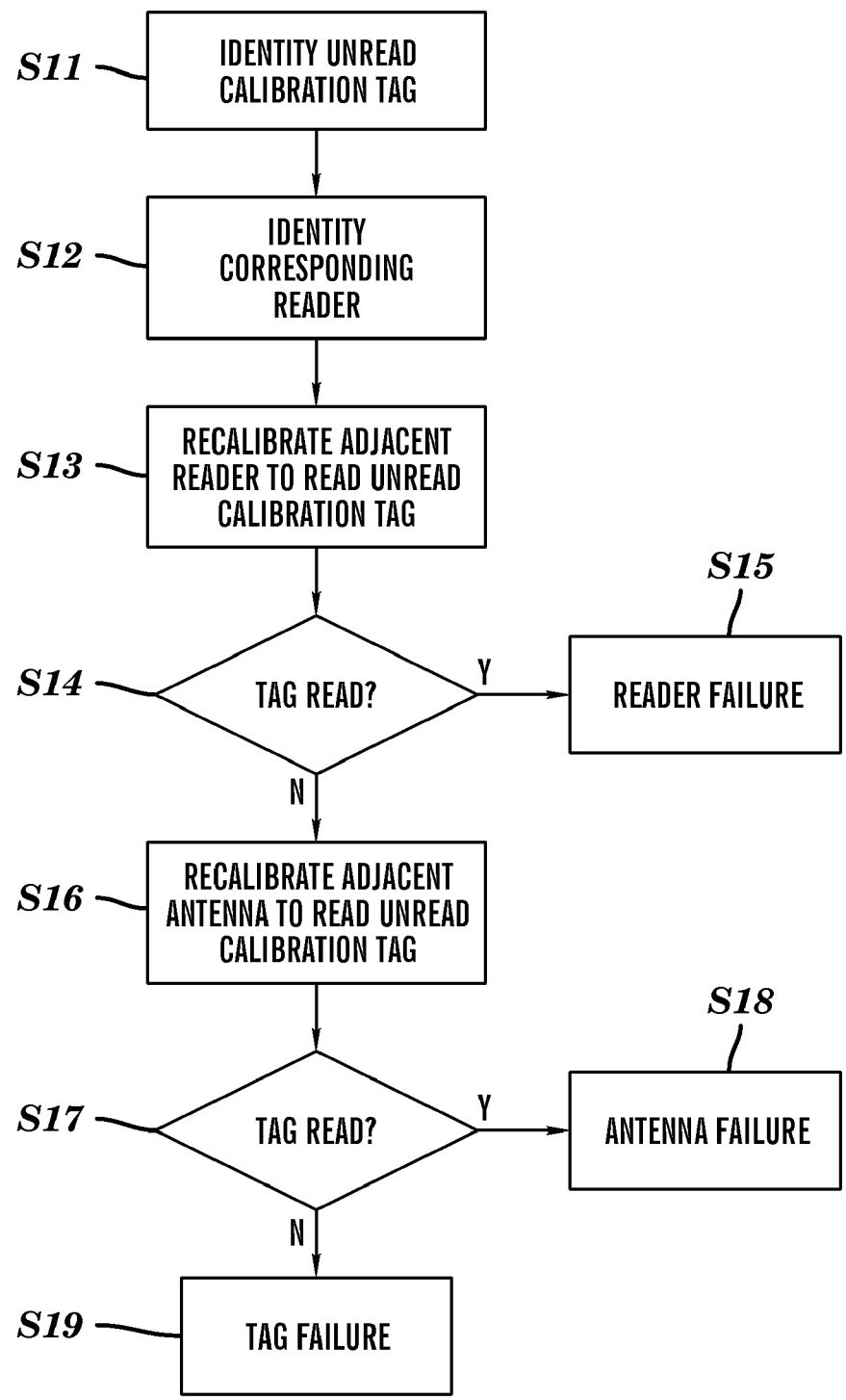

FIG. 9 shows a block diagram of an illustrative method for determining a source of failure in an RFID network according to the invention. At step S11, a calibration RFID tag within an RFID network is identified as not being read by any RFID reader within the network. Next, at step S12, the RFID reader that should be reading the unread calibration RFID tag is identified. At step S13, an RFID reader within the RFID network is recalibrated to read the unread calibration RFID tag. Preferably, this recalibrated RFID reader is adjacent the RFID reader identified in step S12. At step S14, a determination is made as to whether the recalibrated RFID tag of step S13 is receiving data from the unread calibration RFID tag of step S11. If such data are received, it is concluded at step S15 that the RFID reader identified in step S12 has failed. If no such data is received, at step S16, an RFID antenna adjacent the RFID reader identified in step S12 is recalibrated to read the unread calibration RFID tag. At step S17, a determination is made as to whether the recalibrated RFID tag of step S16 is receiving data from the unread calibration RFID tag. If such data is received, it is concluded at step S18 that an RFID antenna originally calibrated to read the calibration RFID tag has failed. If no such data is received, it is concluded at step S19 that the calibration RFID tag has failed. Optionally, it may be concluded at step S19 that more than one RFID reader or antenna has failed, although this is generally less likely to occur than the failure of a single calibration RFID tag.

Figure 10:
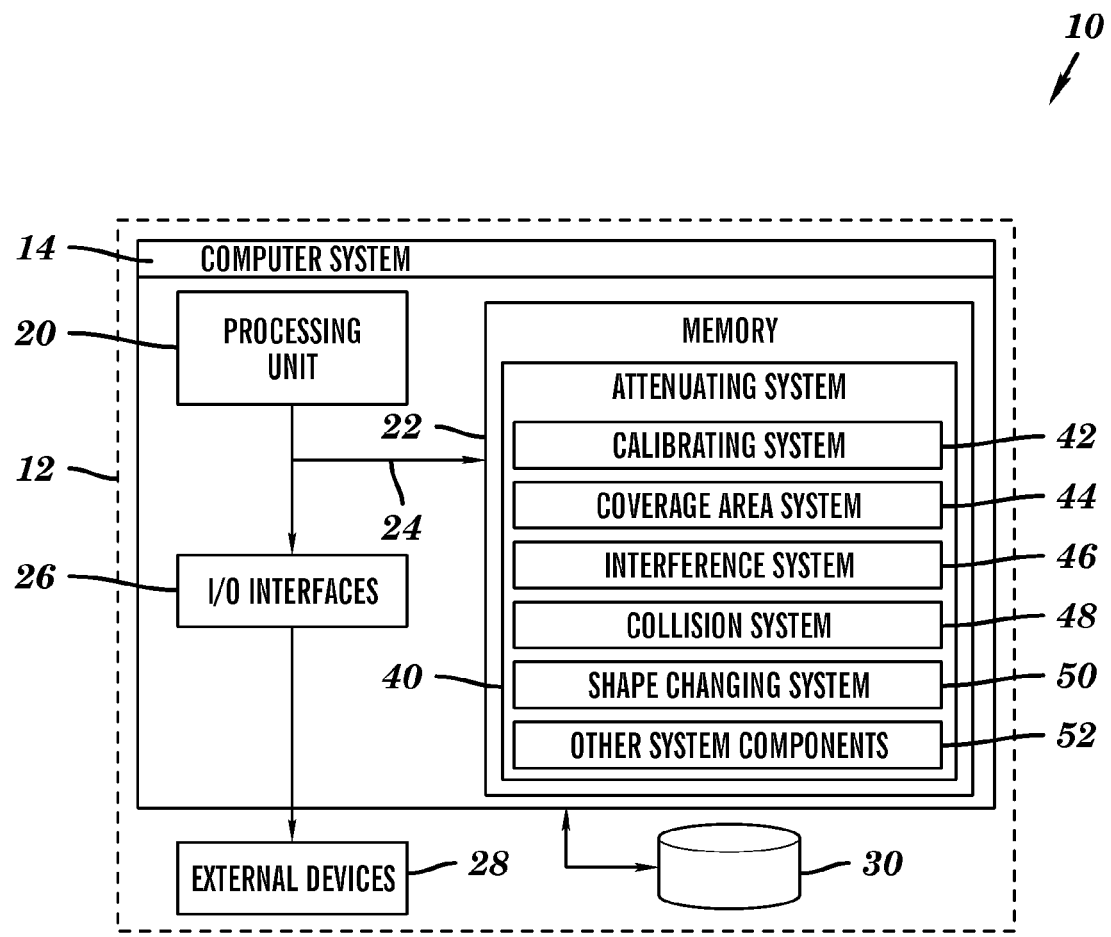
FIG. 10 shows an illustrative system according to the invention.

FIG. 10 shows an illustrative system 10 for attenuating an RFID reader. To this extent, system 10 includes a computer infrastructure 12 that can perform the various process steps described herein for attenuating an RFID reader. In particular, computer infrastructure 12 is shown including a computer system 14 that comprises an attenuation system 40, which enables computer system 14 to attenuate an RFID reader by performing the process steps of the invention.

Computer system 14 is shown including a processing unit 20, a memory 22, an input/output (I/O) interface 26, and a bus 24. Further, computer system 14 is shown in communication with an external devices 28 and a storage system 30. Processing unit 20 executes computer program code, such as attenuating system 40, that is stored in memory 22 and/or storage system 30. While executing computer program code, processing unit 20 can read and/or write data from/to memory 22, storage system 30, and/or I/O interface 26. Bus 24 provides a communication link between each of the components in computer system 14. External devices 28 can comprise any device that enables a user (not shown) to interact with computer system 14 or any device that enables computer system 14 to communicate with one or more other computer systems.

In any event, computer system 14 can comprise any general purpose computing article of manufacture capable of executing computer program code installed by a user (e.g., a personal computer, server, handheld device, etc.). However, it is understood that computer system 14 and attenuating system 40 are only representative of various possible computer systems that may perform the various process steps of the invention. To this extent, in other embodiments, computer system 14 can comprise any specific purpose computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively.

Similarly, computer infrastructure 12 is only illustrative of various types of computer infrastructures for implementing the invention. For example, in one embodiment, computer infrastructure 12 comprises two or more computer systems (e.g., a server cluster) that communicate over any type of wired and/or wireless communications link, such as a network, a shared memory, or the like, to perform the various process steps of the invention. When the communications link comprises a network, the network can comprise any combination of one or more types of networks (e.g., the Internet, a wide area network, a local area network, a virtual private network, etc.). Regardless, communications between the computer systems may utilize any combination of various types of transmission techniques.

As previously mentioned, attenuating system 40 enables computer system 14 to attenuate an RFID reader. To this extent, attenuating system 40 is shown including a calibrating system 42, a coverage area system 44, an interference system 46, a collision system 48, and a shape changing system 50. Operation of each of these systems is discussed above. Attenuating system 40 may further include other system components 52 to provide additional or improved functionality to attenuating system 40. It is understood that some of the various systems shown in FIG. 10 can be implemented independently, combined, and/or stored in memory for one or more separate computer systems 14 that communicate over a network. Further, it is understood that some of the systems and/or functionality may not be implemented, or additional systems and/or functionality may be included as part of system 10.

While shown and described herein as a method, system, and program product for attenuating an RFID reader, it is understood that the invention further provides various alternative embodiments. For example, in one embodiment, the invention provides a computer-readable medium that includes computer program code to enable a computer infrastructure to attenuate an RFID reader. To this extent, the computer-readable medium includes program code, such as attenuating system 40, that implements each of the various process steps of the invention. It is understood that the term "computer-readable medium" comprises one or more of any type of physical embodiment of the program code. In particular, the computer-readable medium can comprise program code embodied on one or more portable storage articles of manufacture (e.g., a compact disc, a magnetic disk, a tape, etc.), on one or more data storage portions of a computer system, such as memory 22 and/or storage system 30 (e.g., a fixed disk, a read-only memory, a random access memory, a cache memory, etc.), and/or as a data signal traveling over a network (e.g., during a wired/wireless electronic distribution of the program code).

In another embodiment, the invention provides a business method that performs the process steps of the invention on a subscription, advertising, and/or fee basis. That is, a service provider could offer to attenuate an RFID reader as described above. In this case, the service provider can create, maintain, support, etc., a computer infrastructure, such as computer infrastructure 12, that performs the process steps of the invention for one or more customers. In return, the service provider can receive payment from the customer(s) under a subscription and/or fee agreement and/or the service provider can receive payment from the sale of advertising space to one or more third parties.

In still another embodiment, the invention provides a method of generating a system for attenuating an RFID reader. In this case, a computer infrastructure, such as computer infrastructure 12, can be obtained (e.g., created, maintained, having made available to, etc.) and one or more systems for performing the process steps of the invention can be obtained (e.g., created, purchased, used, modified, etc.) and deployed to the computer infrastructure. To this extent, the deployment of each system can comprise one or more of (1) installing program code on a computer system, such as computer system 14, from a computer-readable medium; (2) adding one or more computer systems to the computer infrastructure; and (3) incorporating and/or modifying one or more existing systems of the computer infrastructure, to enable the computer infrastructure to perform the process steps of the invention.

As used herein, it is understood that the terms "program code" and "computer program code" are synonymous and mean any expression, in any language, code or notation, of a set of instructions intended to cause a computer system having an information processing capability to perform a particular function either directly or after either or both of the following: (a) conversion to another language, code or notation; and (b) reproduction in a different material form. To this extent, program code can be embodied as one or more types of program products, such as an application/software program, component software/a library of functions, an operating system, a basic I/O system/driver for a particular computing and/or I/O device, and the like.

The foregoing description of various aspects of the invention has been presented for purposes of illustration and description. It is not intended to be exhaustive or to limit the invention to the precise form disclosed, and obviously, many modifications and variations are possible.

What is claimed is:

1. A system for attenuating a radio frequency identification (RFID) reader, the system comprising:
   a system for automatically calibrating at least one antenna of a first RFID reader to a first calibration RFID tag, wherein the system for automatically calibrating includes at least one of the following:
      a system for optimizing a coverage area of the first RFID reader; and
      a system for mitigating environmental interference within the coverage area of the first RFID reader.

2. The system of claim 1, further comprising:
   a system for automatically calibrating at least one antenna of the first RFID reader to a second calibration RFID tag.

3. The system of claim 1, further comprising:
   a system for automatically calibrating at least one antenna of a second RFID reader to a second calibration RFID tag,
   wherein the system for automatically calibrating includes a system for minimizing reader collision between the first RFID reader and the second RFID reader.

4. The system of claim 3, wherein the first RFID reader is calibrated to read the first calibration RFID tag and the second RFID reader is calibrated to read the second calibration RFID tag.

5. The system of claim 1, wherein the first calibration RFID tag is located within a coverage area of a second RFID reader.

6. The system of claim 5, wherein the second RFID reader has failed.

7. The system of claim 5, wherein the system for automatically calibrating includes a system for changing a pattern of the at least one antenna of the first RFID reader.

8. A program product stored on a computer-readable medium, which when executed, attenuates a radio frequency identification (RFID) reader, the program product comprising:
   program code for automatically calibrating at least one antenna of a first RFID reader to a first calibration RFID tag, including at least one of the following:
      program code for optimizing a coverage area of the first RFID reader; and
      program code for mitigating environmental interference within the coverage area of the first RFID reader.

9. The program product of claim 8, further comprising:
   program code for automatically calibrating at least one antenna of the first RFID reader to a second calibration RFID tag.

10. The program product of claim 8, further comprising:
program code for automatically calibrating at least one antenna of a second RFID reader to a second calibration RFID tag, including program code for minimizing reader collision between the first RFID reader and the second RFID reader.

11. The program product of claim 10, wherein the first RFID reader is calibrated to read the first calibration RFID tag and the second RFID reader is calibrated to read the second calibration RFID tag.

12. The program product of claim 10, wherein the first calibration RFID tag is located within a coverage area of a second RFID reader.

13. The program product of claim 12, wherein the second RFID reader has failed.

14. The program product of claim 12, further comprising program code for changing a pattern of the at least one antenna of the first RFID reader.

* * * * *